United States Patent
Zhang et al.

(10) Patent No.: US 10,983,235 B2
(45) Date of Patent: Apr. 20, 2021

(54) CHARACTERIZING DEPOSITIONAL FEATURES BY GEOLOGIC-BASED SEISMIC CLASSIFICATION

(71) Applicant: Saudi Arabian Oil Company, Dhahran (SA)

(72) Inventors: Si-Hai Zhang, Dhahran (SA); Yin Xu, Dhahran (SA); Mahdi A. AbuAli, Dhahran (SA)

(73) Assignee: Saudi Arabian Oil Company, Dhahran (SA)

( * ) Notice: Subject to any disclaimer, the term of this patent is extended or adjusted under 35 U.S.C. 154(b) by 271 days.

(21) Appl. No.: 16/131,316

(22) Filed: Sep. 14, 2018

(65) Prior Publication Data

US 2020/0088898 A1    Mar. 19, 2020

(51) Int. Cl.
*G01V 1/34*    (2006.01)
*G01V 1/30*    (2006.01)
*G06K 9/62*    (2006.01)

(52) U.S. Cl.
CPC .............. *G01V 1/345* (2013.01); *G01V 1/302* (2013.01); *G01V 1/308* (2013.01); *G06K 9/6267* (2013.01); *G01V 2210/63* (2013.01)

(58) Field of Classification Search
CPC ........ G01V 1/345; G01V 1/308; G01V 1/302; G01V 1/30; G01V 2210/63; G06K 9/6267
See application file for complete search history.

(56) References Cited

U.S. PATENT DOCUMENTS 5,884,229 A    3/1999  Matteucci
6,226,596 B1   5/2001  Gao
(Continued)

FOREIGN PATENT DOCUMENTS

| CN | 102053270 | 5/2011 |
| CN | 107356958 | 11/2017 |
| WO | WO 0229445 | 4/2002 |

OTHER PUBLICATIONS

Singh et al., Facies Classification Based on Seismic Waveform—A Case Study From Mumbai High North, 2004, 5th Conference & Exposition on Petroleum Geophysics, Hyderabad-2004, India, pp. 456-462 (Year: 2004).*

(Continued)

*Primary Examiner* — Toan M Le
(74) *Attorney, Agent, or Firm* — Fish & Richardson P.C.

(57) ABSTRACT

The disclosure provides methods and systems for characterizing depositional features. The methods and systems include accessing data encoding seismic waves as seismic traces reflected from cells at various locations within a particular stratum in response to a seismic source. The cells are classified into multiple non-overlapping groups according to the amplitude values or other seismic attributes of the seismic waves reflected from the various locations within the particular stratum. One or more subgroups of adjacent cells are identified. A subgroup area metric is calculated for each subgroup of cells by combining individual area metrics from adjacent cells in a given subgroup and subsequently assigning the calculated subgroup area metric to each cell of the given subgroup. One or more depositional features within the stratum are characterized based at least in part on the variation map based on the subgroup area metric of each cell.

18 Claims, 13 Drawing Sheets

(56) References Cited

U.S. PATENT DOCUMENTS

| | | | |
|---|---|---|---|
| 6,438,493 | B1 | 8/2002 | West et al. |
| 8,219,322 | B2 | 7/2012 | Monsen |
| 8,838,425 | B2 | 9/2014 | Zhang et al. |
| 9,121,971 | B2 | 9/2015 | Thorne |
| 2003/0110018 | A1 | 6/2003 | Dutta et al. |
| 2003/0200030 | A1 | 10/2003 | Meldahl |
| 2008/0175478 | A1 | 7/2008 | Wentland et al. |
| 2011/0048731 | A1 | 3/2011 | Imhof et al. |
| 2011/0251797 | A1 | 10/2011 | Leger et al. |
| 2012/0261135 | A1 | 10/2012 | Nowak et al. |
| 2013/0064040 | A1 | 3/2013 | Imhof et al. |
| 2015/0073715 | A1 | 3/2015 | Aarre |
| 2016/0313463 | A1 | 10/2016 | Wahrmund et al. |
| 2017/0011149 | A1 | 1/2017 | Liu et al. |

OTHER PUBLICATIONS

Zhang et al., Characterizing Stratigraphic Traps Using Improved Waveform Classification Seismic Facies Analysis: An Example from Central Saudi Arabia, Dec. 2016, First Break vol. 34, pp. 77-84 (Year: 2016).*

Gibson et al. "Apparent layering in common midpoint stacked images of two dimensionally heterogeneous targets," Geophysics vol. 55, Issue 11, Nov. 1990, 12 pages.

Gibson, "Analysis of lateral coherence in wide angle seismic images of heterogeneous targets," Journal of Geophysical Research, vol. 96, Jun. 10, 1991, 13 pages.

U.S. Appl. No. 13/695,226, filed Apr. 22, 2011, Imhof et al.

Goovearts, "Chapter 8: Assessment for Spatial Uncertainty," in Geostatistics for natural resources evaluation, Oxford University Press, Jan. 1997, 7 pages.

Mitchum, "Seismic stratigraphy and global changes of sea level: part 6, Stratigraphic interpretations of seismic reflection patters in depositional sequences, Section 2. Application of seismic reflection configuration of stratigraphic interpretation," American Association of Petroleum Geologists, Jan. 1977, 17 pages.

Remy et al., "Geostatistics: a recall of concepts," in Applied geostatistics with SGeMS: A user's guide, Cambridge University Press, Jul. 2009, 5 pages.

Vinther et al., "3-D seismic texture classification," Presented at the European 3-D Reservoir Modelling Conference, Society of Petroleum Engineers, Apr. 16-17, 1996, 7 pages.

Vossler, "Automatic delineation of lateral facies changes in clastic environments," presented at the 59th Annual International meeting, Society of Exploration Geophysicists, paper SI 5.4, Oct. 29-Nov. 2, 1989, 2 pages.

Zhang et al., "A statistical information reconstruction method of images based on multiple-point geostatistics integrating soft data with hard data," presented in the ISCSCT'08 International Symposium, Computer Science and Technology vol. 1, Dec. 2008, 6 pages.

Zhang et al., "Porous media reconstruction using a cross-section image and multiple-point geostatistics," presented at the ICACC'09 International Conference, Advanced Computer Control, Feb. 2009, 6 pages.

International Search Report and Written Opinion issued in International Application No. PCT/US2019/050784 dated Dec. 16, 2019, 15 pages.

Roksandic et al., "Seismic Facies Analysis Concepts," Geophysical Prospecting, vol. 26, No. 2, Jun. 1, 1978, 16 pages.

Lerat et al., "Construction of a Stochastic Geological Model Constrained by High-Resolution 3D seismic data—Application to the Girassol field, offshore Angola," SPE Annual Technical Conference and Exhibition, vol. 4, No. 110422, Nov. 11, 2007, 16 pages.

Gulf Cooperation Council Examination Report issued in GCC Application No. GC 2019-38273 on Oct. 25, 2020, 4 pages.

* cited by examiner

CHARACTERIZING DEPOSITIONAL FEATURES BY GEOLOGIC-BASED SEISMIC CLASSIFICATION

TECHNICAL FIELD

This disclosure relates to the field of seismic stratigraphy and, more particularly, to sedimentary facies analysis and reflection character analysis. Specifically, the disclosure relates to quantitative characterization of the depositional features of a given stratum in a formation.

BACKGROUND

In geology, sedimentary facies are bodies of sediment that are recognizably distinct from adjacent sediments that resulted from different depositional environments. Generally, geologists distinguish facies by aspects of the rock or sediment being studied. Seismic facies are groups of seismic reflections whose parameters (such as amplitude, continuity, reflection geometry, and frequency) differ from those of adjacent groups. Seismic facies analysis, a subdivision of seismic stratigraphy, plays an important role in hydrocarbon exploration and is a step in the interpretation of seismic data for reservoir characterization. The seismic facies in a given geological area can provide useful information, particularly about the types of sedimentary deposits and the anticipated lithology.

SUMMARY

The present disclosure describes methods and systems for characterizing depositional features by geologic-based seismic classification, for example, to assist oil exploration in the formation. Reflection variations may be generated by probing the earth's interior by using seismic sources (for example, acoustic input shots), recording the reflected acoustic signals, and then constructing a reflection variation map. Quantifying the spatial reflection variation can characterize the depositional features through geologic-based seismic classification at a specified target formation or depth. The spatial variation, one of the properties of sedimentary facies and stratigraphy, can be measured by classifying a seismic attribute based on geological knowledge.

In one approach, the seismic attribute is the amplitude of a seismic wave reflected from a particular geolocation (for example, a location within a seismic stratum). A compound seismic amplitude value can be determined by summation of the amplitude of the seismic wave over a window along the thickness direction of the seismic stratum. The thickness direction of a seismic stratum indicates the direction generally perpendicular the extent of the stratum. For example, the thickness direction of horizontally extending stratum is vertical. In particular, the summation can be performed for amplitude values that are positive to generate a mean value. The mean value can then be adjusted by a scaling factor. The resulting compound seismic amplitude values for the seismic stratum can be grouped into multiple bins, each covering a sub-range of compound seismic amplitude values. In some instances, the grouping can use n spaced bins that divide the total range of compound seismic amplitude values. The bins can be different sizes rather being generated by dividing the total range evenly. The spatial distribution of the compound seismic amplitude values for this seismic stratum can be shown on n variation maps, each for a specific sub-range of compound seismic amplitude values. On each variation map, the spatial distribution of the compound seismic amplitude value within the corresponding sub-range can be analyzed for geometric features such as, for example, shapes and areas associated with individual shapes. When these n variation maps from all sub-ranges are merged, some implementations use the consolidated geometric features to drive classification of sedimentary facies (for example, in support of well placement decisions).

Some methods for characterizing depositional features of a formation by seismic classification include accessing data associated with the formation. The data can encode seismic waves as seismic traces reflected from cells at various locations within a particular stratum of the formation in response to a seismic source. Each seismic trace can include a seismic attribute representing a seismic wave reflected from the respective location of a particular cell within the particular stratum. The cells can be classified into multiple non-overlapping groups according to the seismic attributes of the seismic waves reflected from the various locations within the particular stratum. For each non-overlapping group of cells, one or more subgroups of adjacent cells can be identified. For the one or more subgroups of adjacent cells identified from a particular group of cells, a subgroup area metric for each subgroup of cells can be calculated by combining individual area metrics from adjacent cells in a given subgroup and subsequently assigning the calculated subgroup area metric to each cell of the given subgroup. A variation map of the stratum can be generated based on the subgroup area metric of each cell. One or more depositional features within the stratum can be characterized based at least in part on the variation map using the area metric. The characterization can be displayed to a user on a user-interface to assist oil exploration in the formation. Embodiments of these methods can include one or more of the following features.

Some methods include activating the seismic source to launch the seismic waves into the formation.

Some methods include generating an indication to drill a well at a position selected based at least in part on the variation map.

In some methods, the seismic attribute is an amplitude value of the seismic waves reflected from the various locations within the particular stratum. In some cases, classifying the cells from the particular stratum into multiple non-overlapping groups includes computing compound amplitude values of the seismic waves reflected from the locations within the particular stratum by summing positive amplitude values of the seismic wave. Summing positive amplitude values of the seismic wave can include retaining locational information of the compound amplitude values of the seismic wave to indicate where the compound amplitude values are located within the given stratum.

Some methods include determining a range of the compound amplitude values. The methods can also include dividing the range of the compound amplitude values into multiple non-overlapping and continuous sub-ranges such that the one of more subgroups of adjacent cells are identified. Each subgroup of cells can form a continuous patch of cells whose corresponding compound amplitude values are within a particular subrange of the compound amplitude values.

Some methods include segmenting each subgroup of cells for each particular sub-range to determine boundaries of each corresponding subgroup within the given stratum. In some cases, methods also include determining an area for each corresponding subgroup based on the segmented subgroup of cells. In some cases, methods also include normalizing the areas determined for the segmented subgroups of adjacent cells that correspond to the particular subrange of the compound amplitude values.

Some methods include determining a shape for each corresponding subgroup of cells based on the segmented subgroup of cells.

In some methods, generating the variation map comprises: consolidating determinations of the area metric from all subgroups of cells and for all sub-ranges of the compound amplitude values.

Some methods include normalizing the area metrics determined for the segmented subgroups from all sub-ranges of the compound amplitude values.

In some methods, the area metric includes an area or a shape to provide improved differentiation between dunes and fluvial facies within the particular stratum compared to the length metric that does not comprise the area or the shape.

Some computer systems include one or more processors configured to perform operations implement these methods.

Implementations of these methods and systems may be realized in computer-implemented methods, hardware computing systems, and tangible computer readable media. For example, a system of one or more computers can be configured to performed particular actions by virtue of having software, firmware, hardware, or a combination of them installed on the system that, in operation, causes or cause the system to perform the actions. One or more computer programs can be configured to perform particular actions by including instructions that, when executed by data processing apparatus, cause the apparatus to perform the actions.

These systems and methods leverage the differentiating characteristics of relative reflectivity and geometry exhibited by, for example, fluvial facies, dune facies, and playa facies, to render the classification of sedimentary facies more accurate than is feasible with approaches that do not incorporate area as a parameter. By characterizing the shape and distribution of sediments, these systems and methods can identify depositional environments and visually delineate depositional features.

The details of one or more implementations of the subject matter of this specification are set forth in the description, the claims, and the accompanying drawings. Other features, aspects, and advantages of the subject matter will become apparent from the description, the claims, and the accompanying drawings.

DESCRIPTION OF DRAWINGS

Like reference numbers and designations in the various drawings indicate like elements.

DETAILED DESCRIPTION

This disclosure describes specific implementations to drive quantitative characterization of depositional features by geological-based seismic classification in a specific target formation. Initially, a surface (for example, a seismic amplitude surface) of a specific stratum is extracted from a three-dimensional (3D) seismic volume. The surface has a range of values and the range is divided into different sub-ranges or groups according to the amplitude value. In a seismic survey, seismic amplitude is a measure of the contrast in properties between two layers. In some instances, the groups use a number (n) of equally spaced bins that evenly divide the entire seismic amplitude range. Individual cells of the seismic amplitude surface are assigned to groups based on the amplitude value of the cells. A sub-surface is generated for each group. Each sub-surface may include one or more compartments or subgroups of cells that are adjacent to each other. The edges of the subgroups of adjacent cells are detected and corresponding shapes are generated in each sub-surface. In some instances, the area of the shapes are calculated and assigned to each shape. The resulting sub-surfaces may then merged to provide a holistic view of formation geometry. The area metric can quantitatively measure the spatial distribution of sedimentary facies while the shape can characterize the geometry of sedimentary facies. By integrating these metrics into reflection variation analysis, the implementations described in this document can improve classification of sedimentary facies, in particular by distinguishing dunes and fluvial features.

Figure 1:
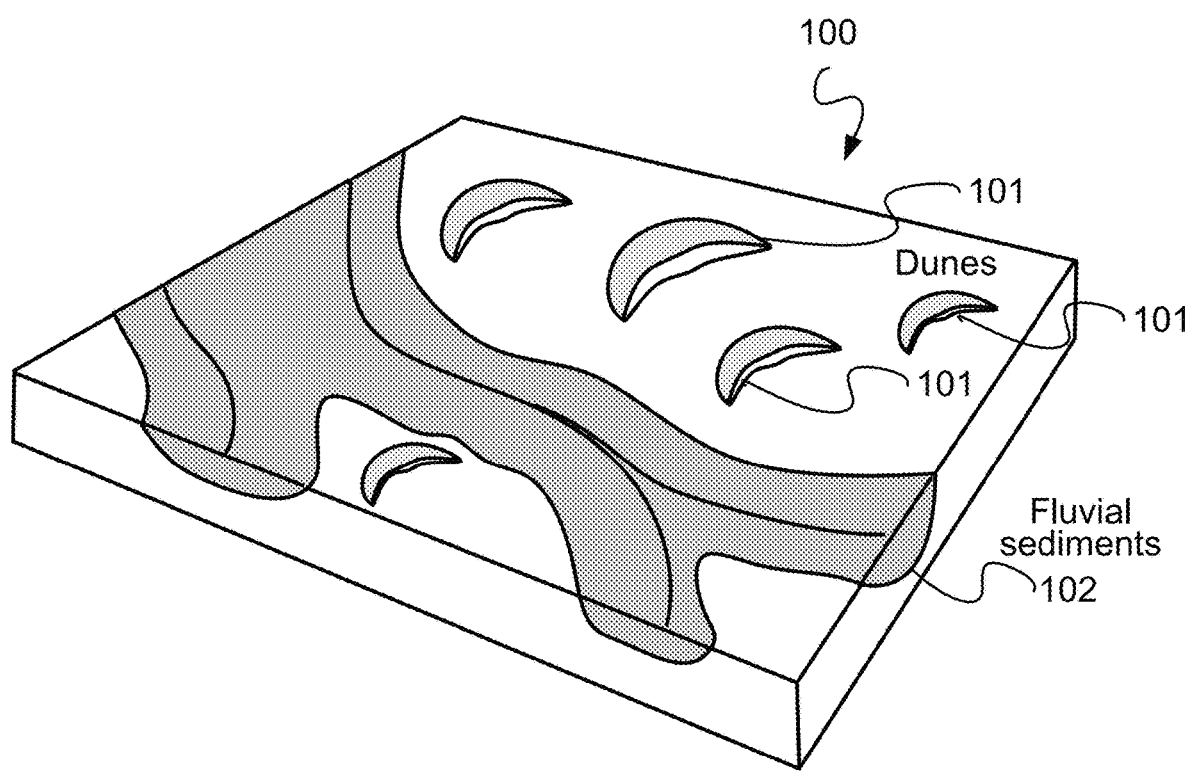
FIG. 1 illustrates an example of a distribution of dunes and fluvial sediments in a formation.
Figure 2:
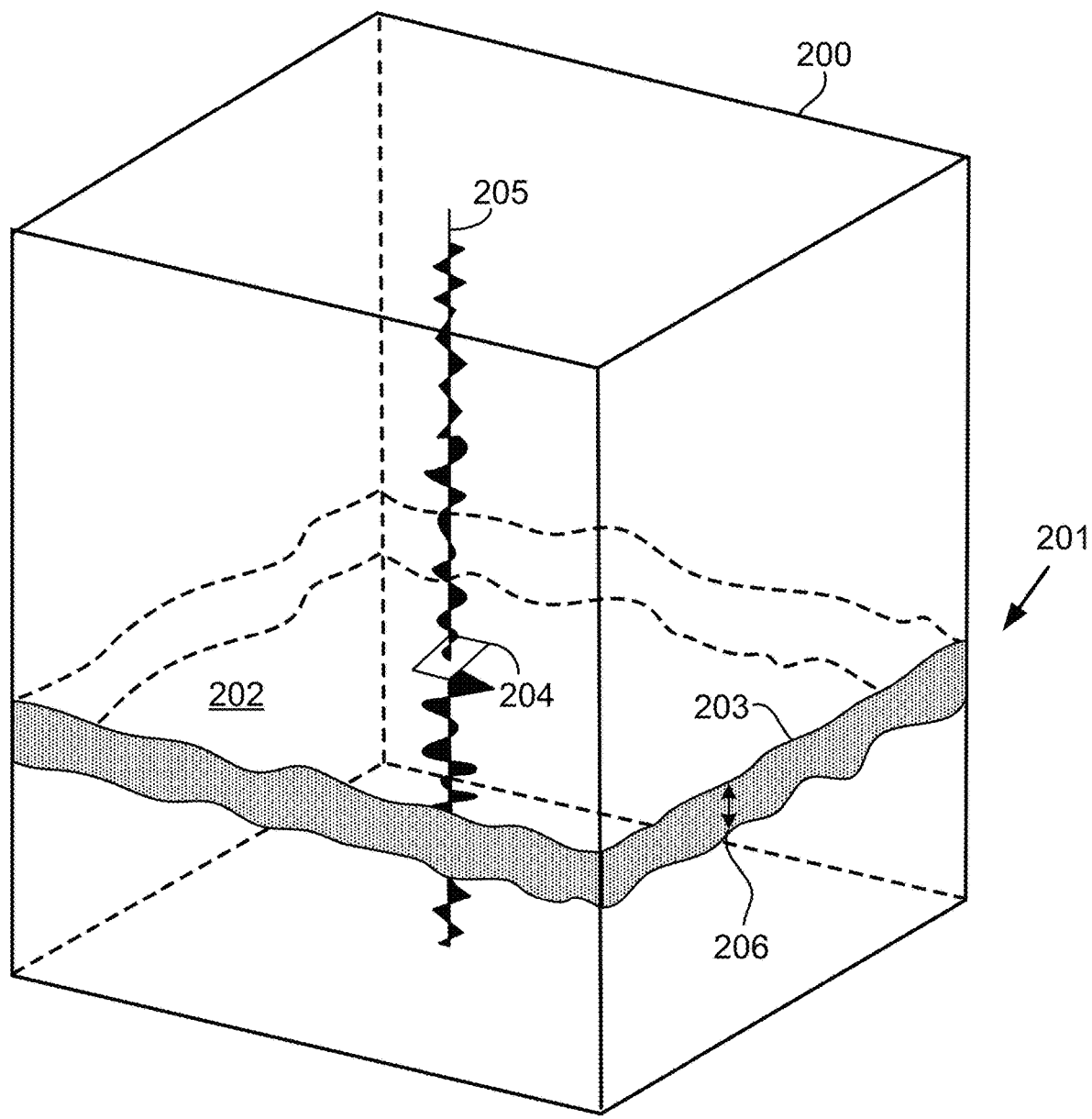
FIG. 2 illustrates a stratigraphic trace within a formation.
Figure 3A:
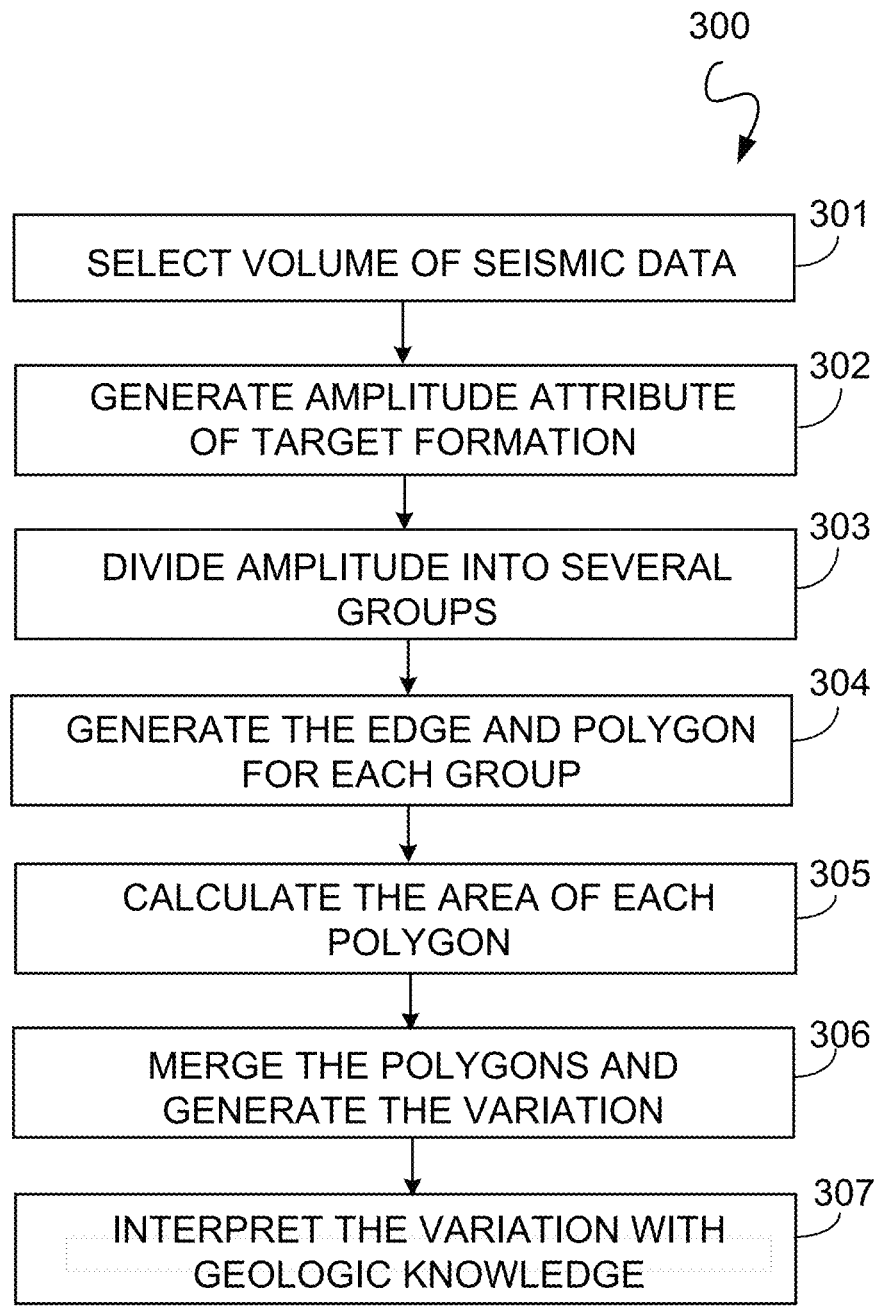
FIGS. 3A and 3B are flow charts illustrating a method of characterization of depositional features by geologic-based classification.
Figure 3B:
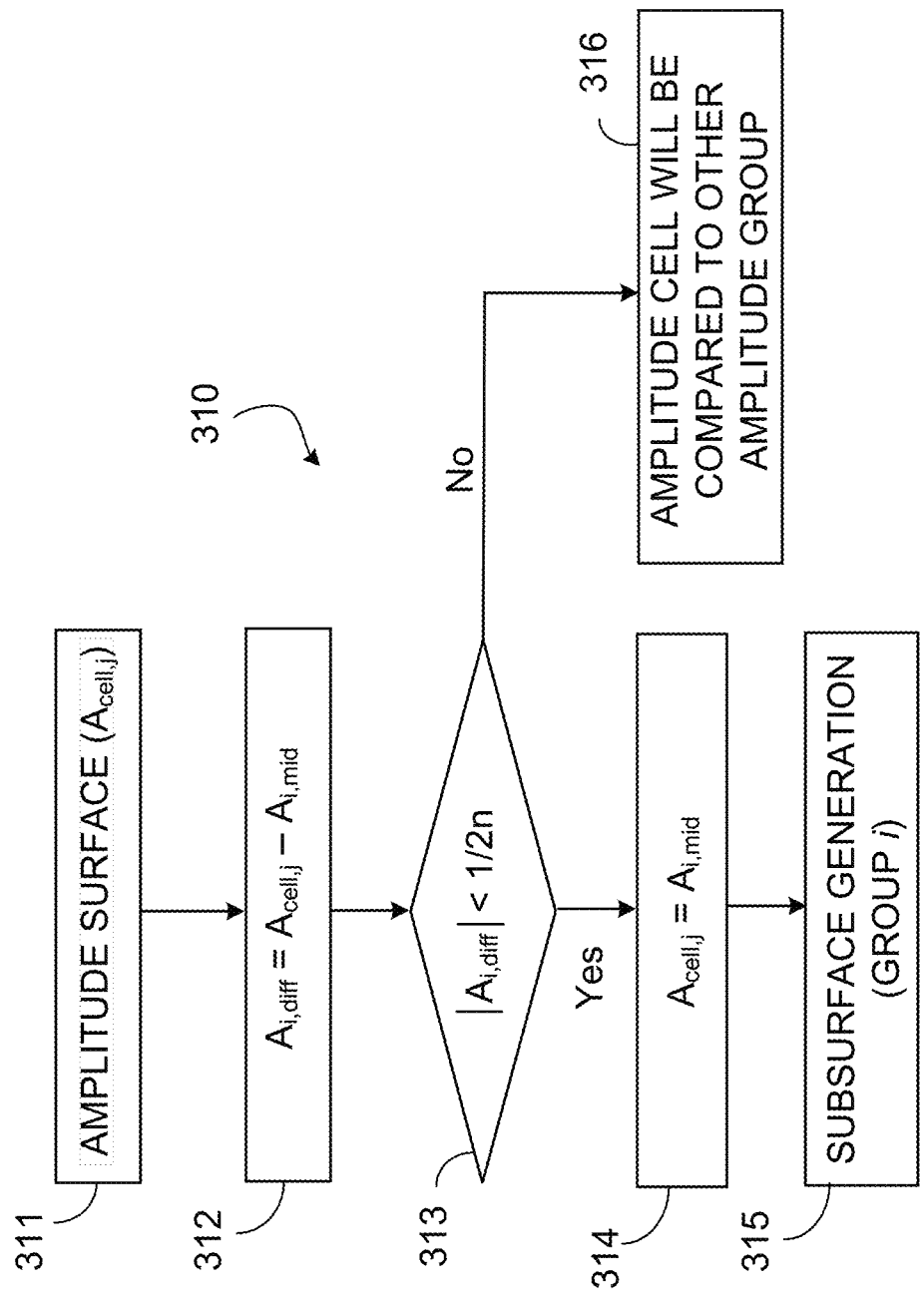
Figure 5A:
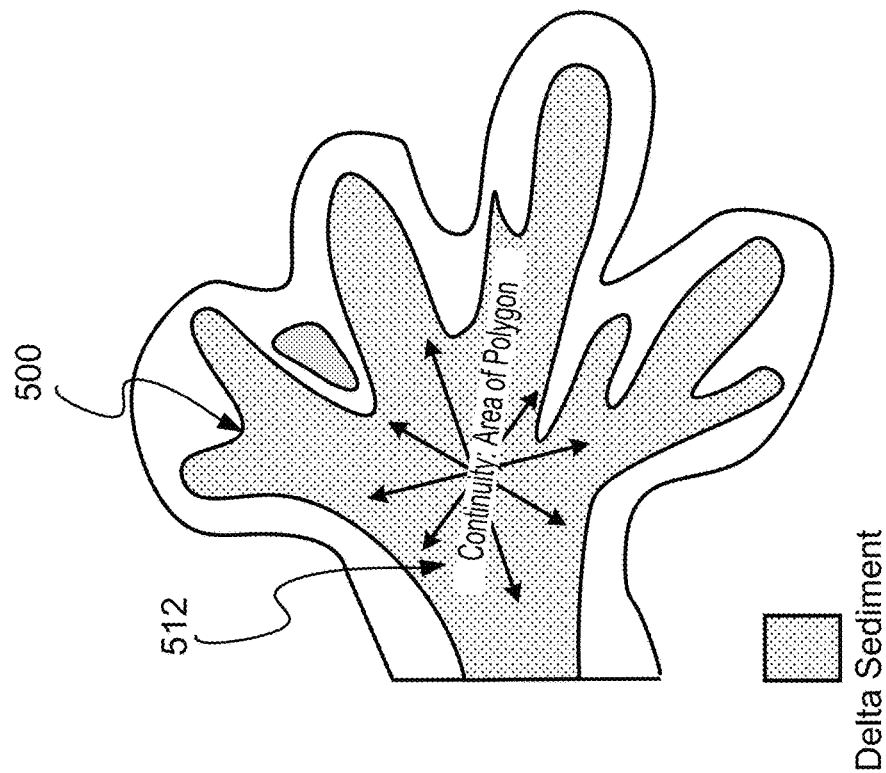
FIGS. 5A and 5B contrast two methods of differentiating depositional features.
Figure 5B:
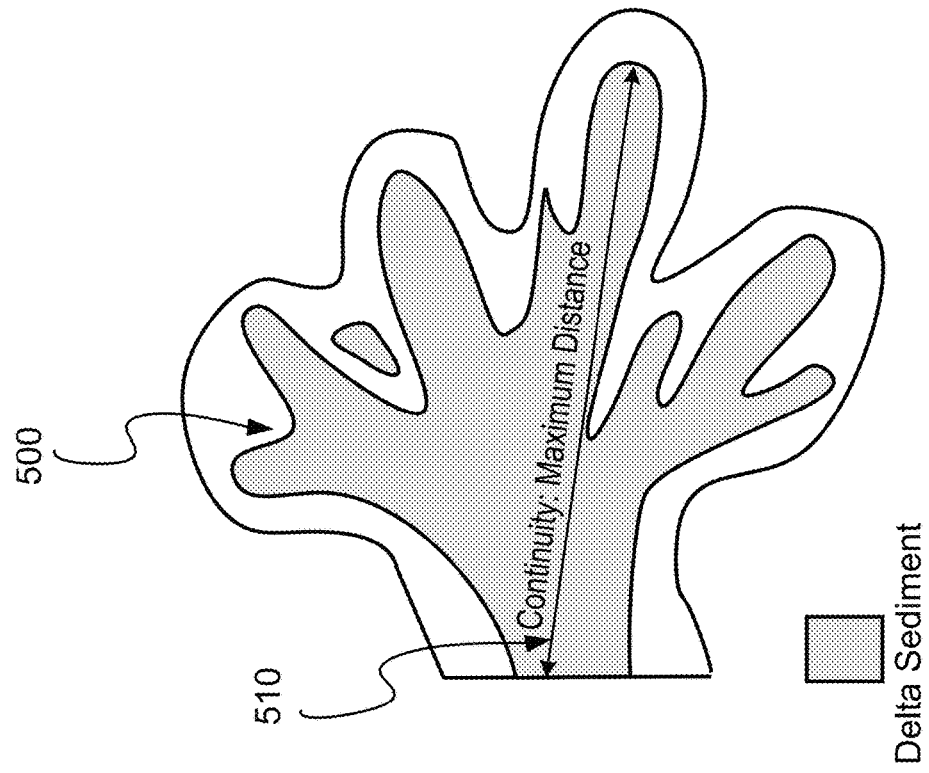
Figure 6:
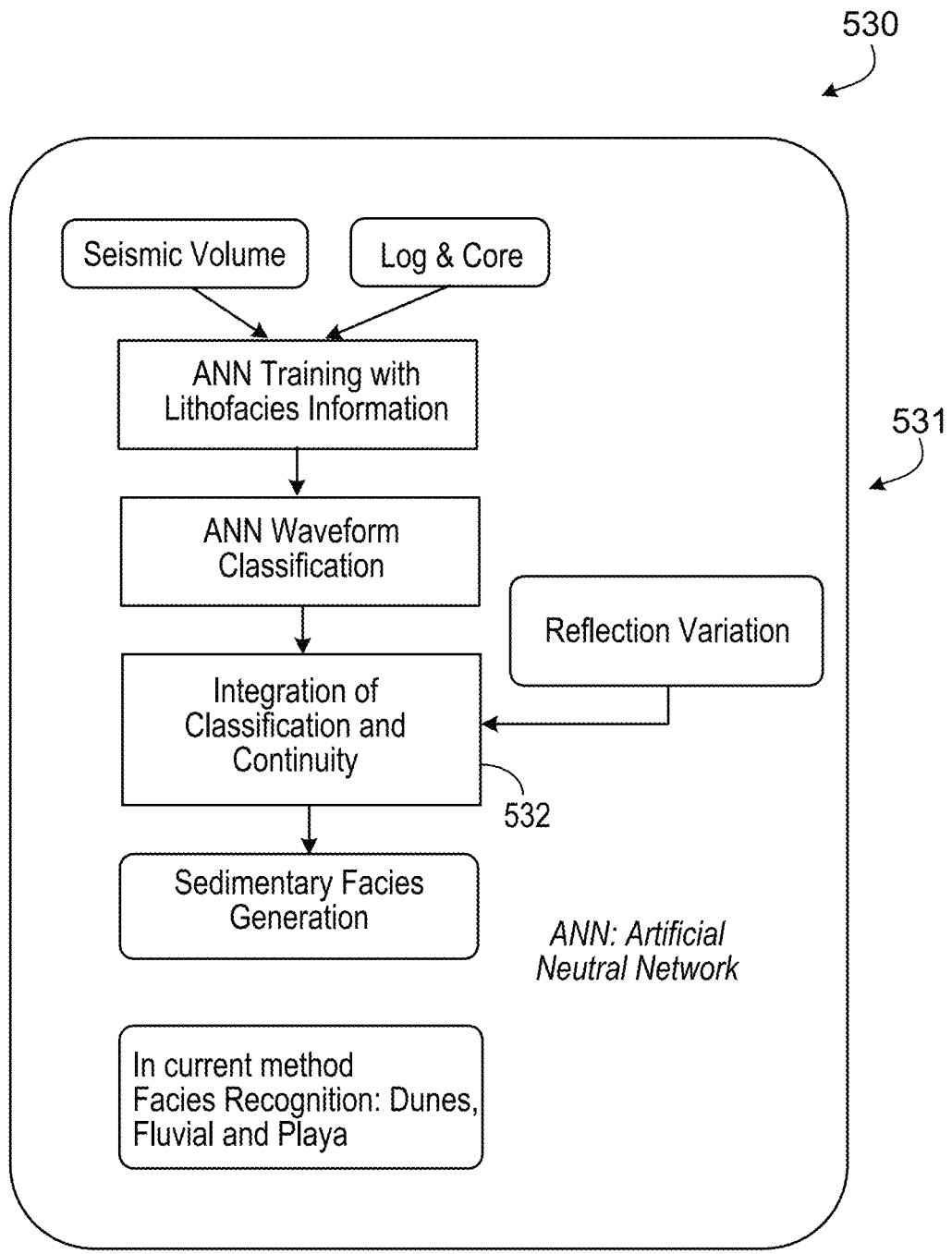
FIG. 6 illustrates an example in which a system implementing the method of FIGS. 3A and 3B is integrated with workflows to improve characterization of sedimentary facies.
Figure 7:
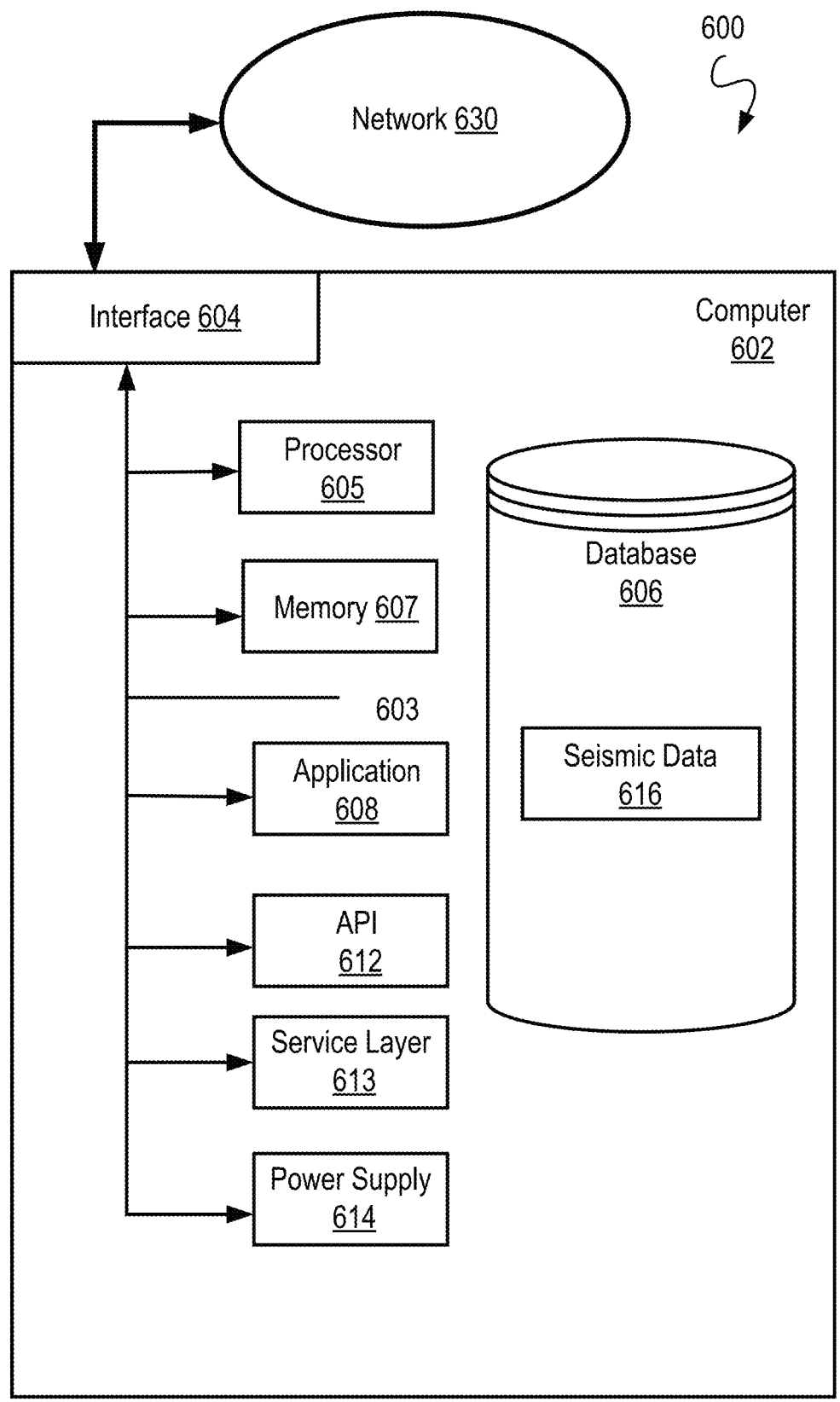
FIG. 7 is a block diagram illustrating an example of a computer system used to provide computational functionalities associated with described algorithms, methods, functions, processes, flows, and procedures to implement these systems and methods.

FIGS. 1 and 2 illustrate an example of geologic features under investigation and an example of seismic data arrangement. Based on this contextual information, FIGS. 3A and 3B illustrate a method of characterization of depositional features by geologic-based classification. FIGS. 4A to 4F show examples of intermediary output produced by processing a seismic data volume using systems implementing the method of FIGS. 3A and 3B. FIGS. 5A and 5B contrast two methods of differentiating depositional features. FIG. 6 illustrates incorporating quantitative characterization of the depositional features into a larger framework of seismic data analysis. FIG. 7 shows an example of a computer implementation that builds on the disclosed methods.

FIG. 1 illustrates a formation 100 including dunes 101 and fluvial sediments 102. The fluvial sediments 102 are sediments associated with rivers and streams that were presented when the formation was deposited. As illustrated, dunes 101 are typically distributed in patches. In contrast, the fluvial sediments 102 typically have continuous, winding distributions with areas that are relatively bigger than the areas of individual dunes 101. The sedimentary facies resulting from dunes 101 can be distinguished from the sedimentary facies resulting from fluvial deposits 102 by these differences in continuity and size.

FIG. 2 illustrates a seismic cube 200 representing a formation. The seismic cube has a stratum 201 based on a surface (for example, amplitude surface 202) and a stratigraphic horizon 203. The amplitude surface 202 and the stratigraphic horizon 203 are grids that include many cells such as cell 204. Each cell is a seismic trace representing an acoustic wave. Each seismic trace has an x-coordinate and a y-coordinate and each data point of the trace corresponds to a certain seismic travel time or depth (t or z). For the stratigraphic horizon 203, a time value is determined and then assigned to the cells from the stratum 201. For the amplitude surface 202, the amplitude value of the seismic trace at the time of the corresponding horizon is assigned to the cell. This assignment process is repeated for all of the cells on this horizon to generate the amplitude surface 202 for the stratum 201. In some instances, the amplitude values of the seismic trace 205 within window 206 by horizon 203 are combined to generate a compound amplitude value for stratum 201. In these instances, the compound amplitude value can be the arithmetic mean of the positive amplitudes within the duration of the window, multiplied by the number of seismic samples in the window.

FIGS. 3A and 3B are flow charts illustrating a method 300 for characterization of depositional features by geologic-based classification. FIGS. 4A to 4F show examples of intermediary output produced by processing a seismic data volume using systems implementing the method 300 of FIGS. 3A and 3B.

In the method 300, a 3D volume of a seismic dataset is selected (step 301). In some instances, the seismic dataset refers to a processed 3D dataset used for seismic data interpretation, an example of which has been described earlier with reference to FIG. 2. This seismic dataset can include sets of seismic traces organized into vertical lines in a 3D format. Each trace has lateral coordinate in the form of (x, y), indicating a lateral position within a stratum. Each data point of the trace corresponds to a certain seismic travel time or depth (t or z) indicating an axial position of the stratum.

A stratigraphic horizon is defined for targeted subsurface formation analysis. In some instances, the process is interactive in that a user can enter, through a user interface coupled to the computer processor, a desired depth location of the target stratum or temporal location of the target horizon. Based on the selected stratum or horizon, the computer processor generates a surface based on a specific property of the seismic data.

In some cases, amplitude can be a property of the seismic 3D dataset. Amplitude attributes can provide insight into the stratigraphic nature and quality of a potential reservoir. Amplitude attributes can be measured in several ways including, for example, root-mean-square (RMS) amplitude, average amplitude, maximum amplitude, and minimum amplitude, all of which can be employed for hydrocarbon reservoir characterization. In some implementations, the variation of seismic dataset can be defined by amplitude similarity.

In the method 300, an amplitude attribute is generated for each cell (step 302). The examples of intermediary output shown in FIGS. 4A to 4F were produced using a sum of positive amplitude as the measured attribute. The sum of positive amplitude is a summation of all positive amplitudes in a window multiplied by the number of samples in the window. The sum of positive amplitude can be expressed as:

$$SumPosAmp = \frac{\sum_{i}^{n} PosAmp}{n} * m \quad \text{Equation 1}$$

where i=1, 2, ..., n is the sequential number of positive seismic samples, n is the number of positive seismic samples, and m is the number of positive and negative samples in the window. When the amplitude attribute is expressed as a summation of positive amplitude, the amplitude attribute may be referred to as a compound amplitude. The method 300 can also be implemented using other kinds of amplitude attributes or other seismic attributes as the measured attribute.

The amplitude attribute provides a measure of amplitudes multiplied by the formation thickness (time/depth). A high value may indicate a specific lithology type. In other words, the reflection variation may speak to the underlying geological deposit. The computer processor can compute the sum of positive amplitudes in a small window depicting a thickness of the targeted formation around the selected stratum. The window size is the time thickness of underground formation and depends on the thickness of the studied formation. In one example, the computer processor may access the depth thickness of the formation from geophysical well logs. Thereafter, the computer processor may perform well analysis to tie the seismic data from depth to time to derive the window size or time thickness.

FIG. 2 includes an illustration of a window. In effect, the computer processor aims at one specific geological formation and then calculates the spatial distribution for the surface of amplitude corresponding to this specific geological formation at the target stratum. In one instance, the computed compound amplitude values are normalized from 0 to 1 and the surface is gridded and displayed in color.

Figure 4A:
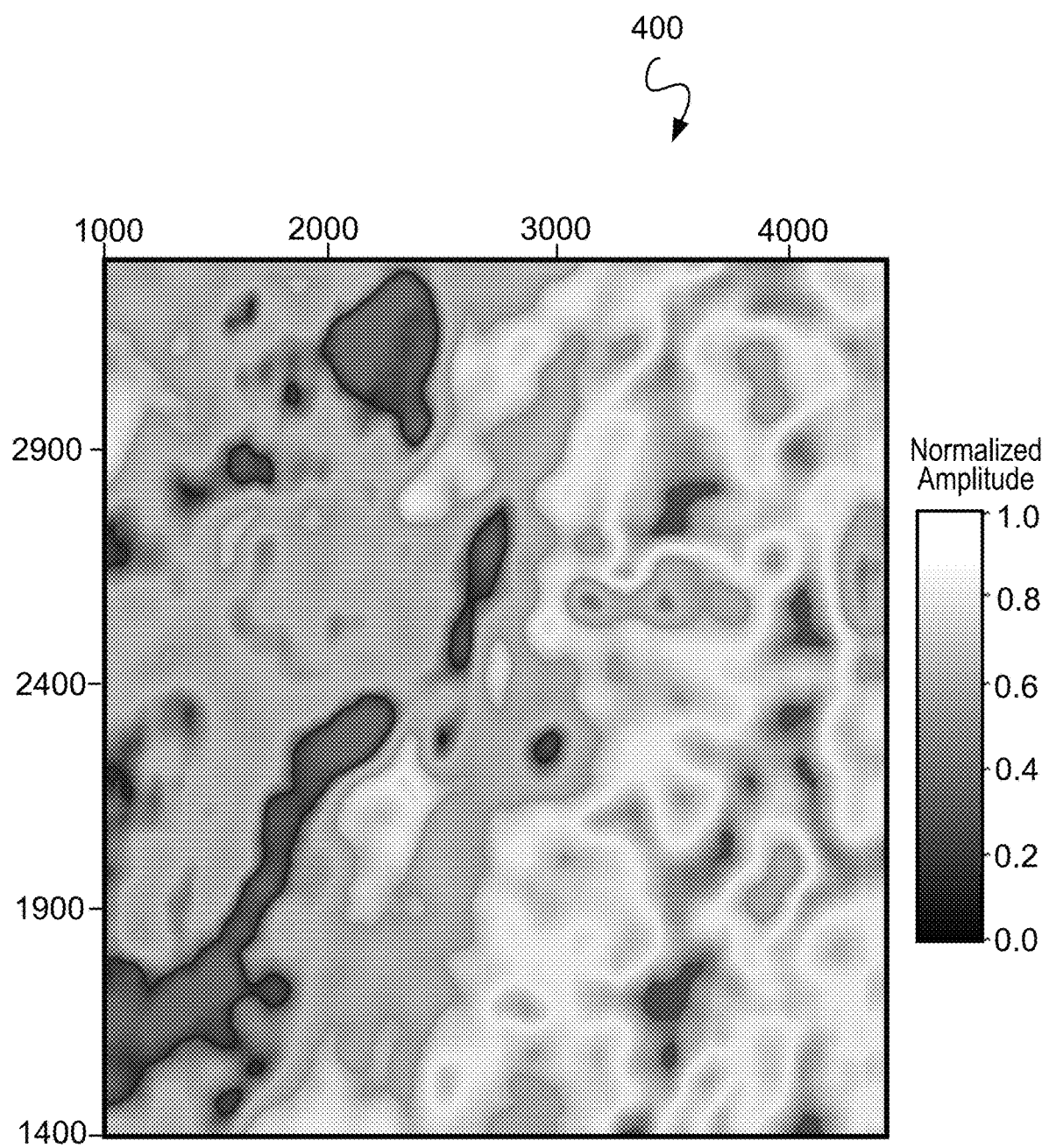
FIGS. 4A to 4F show examples of intermediary output produced by processing a seismic data volume using systems implementing the method of FIGS. 3A and 3B.

FIG. 4A shows a normalized surface 400 with values indicated by the shading representing the computed compound amplitude over the lateral locations indicated by the x and y coordinates at the target stratum. The surface was generated based on a seismic dataset generated by activating an acoustic source in an actual formation.

Amplitude similarity is defined by the difference between amplitudes. Amplitudes with a small difference interval are similar and assigned to one group. By dividing the entire range of amplitude values into multiple non-overlapping subgroups that are adjacently spaced, some implementations can measure similarity in one amplitude surface based on the placement of these non-overlapping sub-ranges relative to the entire amplitude range. In the method 300, the computer processor classifies seismic amplitudes in the surface into several spaced subgroups according to the amplitude values to identify areas with similar amplitudes (step 303).

The computer processor identifies the distribution of amplitude by statistical analysis. The distribution of amplitude ranges from 0 to 1 when the Z values in surface have been normalized.

Figure 4B:
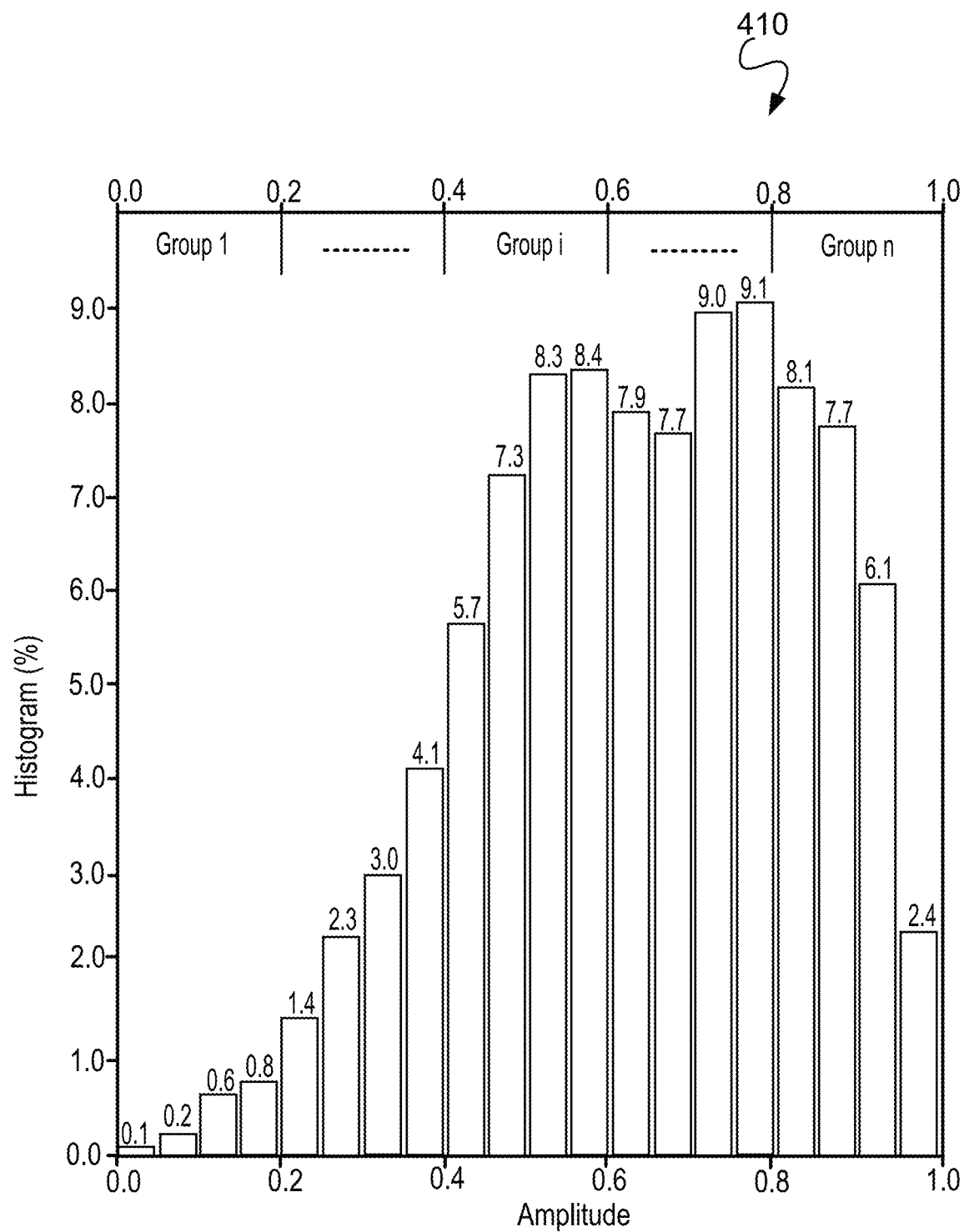

FIG. 4B shows an amplitude histogram 410 generated by the computer processor where the horizontal axis is amplitude and vertical axis is histogram in percentage. A classification number n is chosen based on the amplitude distribution and the amplitude range is divided into n groups with regular or irregular intervals. The classification number n is distinct and independent of the sequential number of positive seismic samples. In some implementations, n is chosen based in part on the number of sedimentary facies in the geological area being investigated. This approach can provide a characterization of depositional environments that is consistent with the local geology. In some implementations, n is chosen based in part on the amplitude distribution in the amplitude histogram. The amplitude histogram 410 has amplitudes with an approximately normal distribution, so subgroups are evenly spaced. Subgroups with varying widths are used when amplitude distribution is irregular.

In each group i, minimum, midpoint and maximum amplitude values are $A_{i,\,min}$, $A_{i,\,mid}$ and $A_{i,\,max}$, respectively. When regular intervals are used, the mathematical expressions of these parameters are given as: $A_{i,\ min}=(i-1)/n$; $A_{i,\ mid}=(2i-1)/2n$; $A_{i,\ max}=i/n$; and interval of group=$1/n$. The number of groups (n) determines the lateral change and amplitude similarity in one group. For example, more groups and smaller intervals leads to smaller differences between the minimum and maximum amplitude in each group. The amplitude histogram 410 was generated by applying this approach to the dataset represented by the normalized surface 400 shown in FIG. 4A.

FIG. 3B provides a flow chart of a method 310 of assigning cells to specific groups (step 303 in FIG. 3A). The method 310 is described using amplitude as the measured property but can be implemented using other properties. In the method 310, the computer processor accesses an amplitude surface (for example, the amplitude surface shown in FIG. 4A) as input (step 311). Amplitudes of individual cells are compared to the midpoint amplitude of group i to determine which group each cell belongs to.

For each lateral location in the amplitude surface for the target stratum, the computer processor computes the difference ($A_{i,\ diff}$) between the amplitude at the lateral location ($A_{cell,\ j}$) and mid-point value for group i ($A_{i,\ mid}$) (step 312). The computer processor then compares the absolute value of the amplitude difference to the half interval of group i (step 313). For n evenly spaced groups, the half interval of each group is $$\frac{1}{2n}.$$

For unevenly spaced groups, the half interval varies. In this example, the five groups shown in FIG. 4B are evenly spaced. If the difference is less than the half interval (0.1 in this example), then midpoint amplitude is assigned to the cell amplitude (step 314). If not, the cell amplitude remains the same and the cell is compared to other amplitude groups when these steps are repeated for the next amplitude group (step 316).

When all the amplitudes in group i ranging from $A_{i,\ min}$ to $A_{i,\ max}$ are assigned the midpoint amplitude of group i, this group of amplitudes is extracted from the original amplitude surface and one new gridded sub-surface is generated (step 315). Steps 311 to 316 from FIG. 3B are repeated for each group, resulting in n groups of surface amplitudes.

Figure 4C:
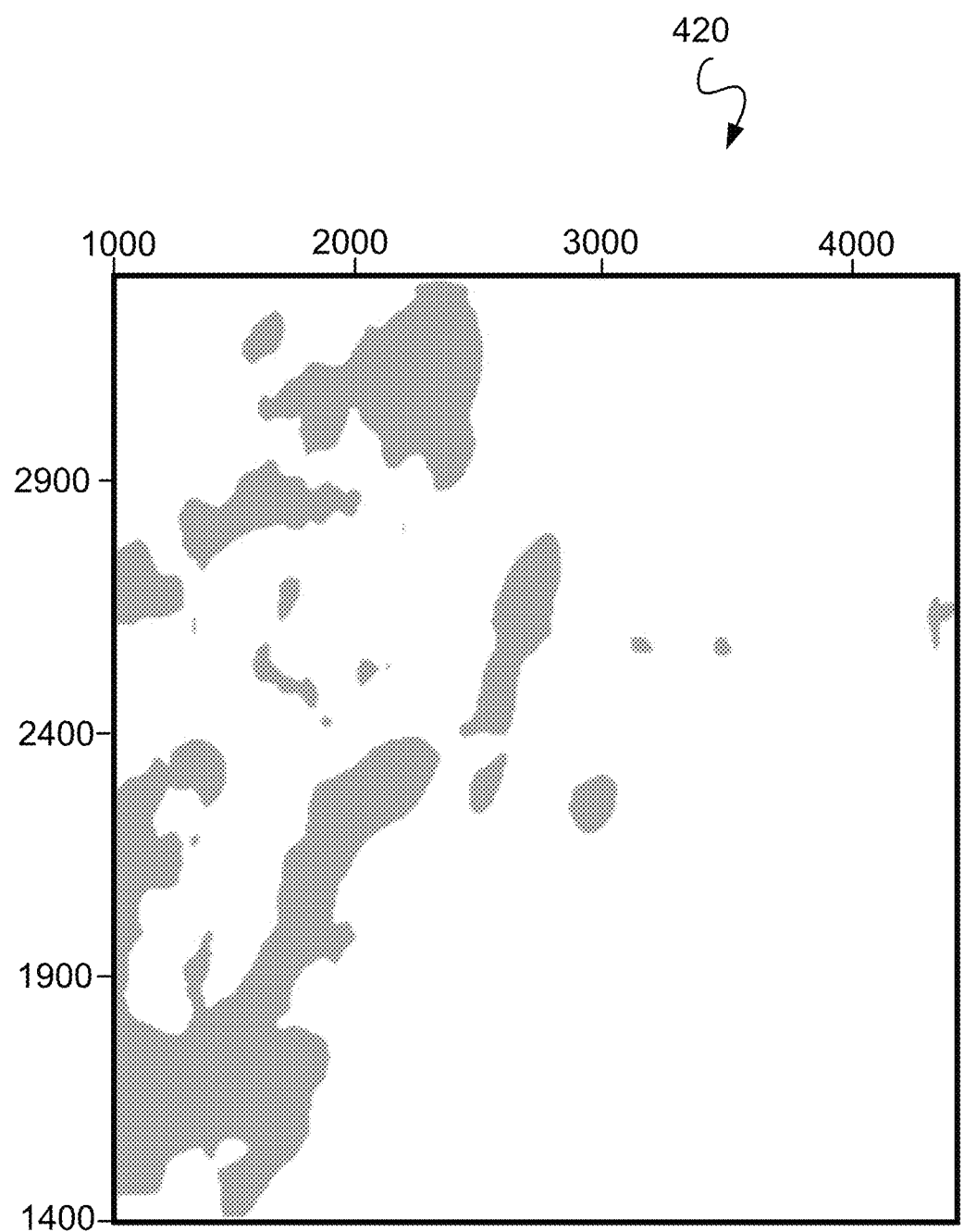

FIG. 4C shows sub-surface 420 generated by applying the method 310 to the normalized surface shown in FIG. 4A with the 5 groups shown in FIG. 4B. The sub-surface 420 represents group 1 cells with measured amplitudes between 0 and 0.2. Each shaded shape represents a subgroup of cells with similar amplitudes that are adjacent to each other. In FIG. 4C, the edges of the surface are clearly delineated because only one group of cells is present.

Figure 4D:
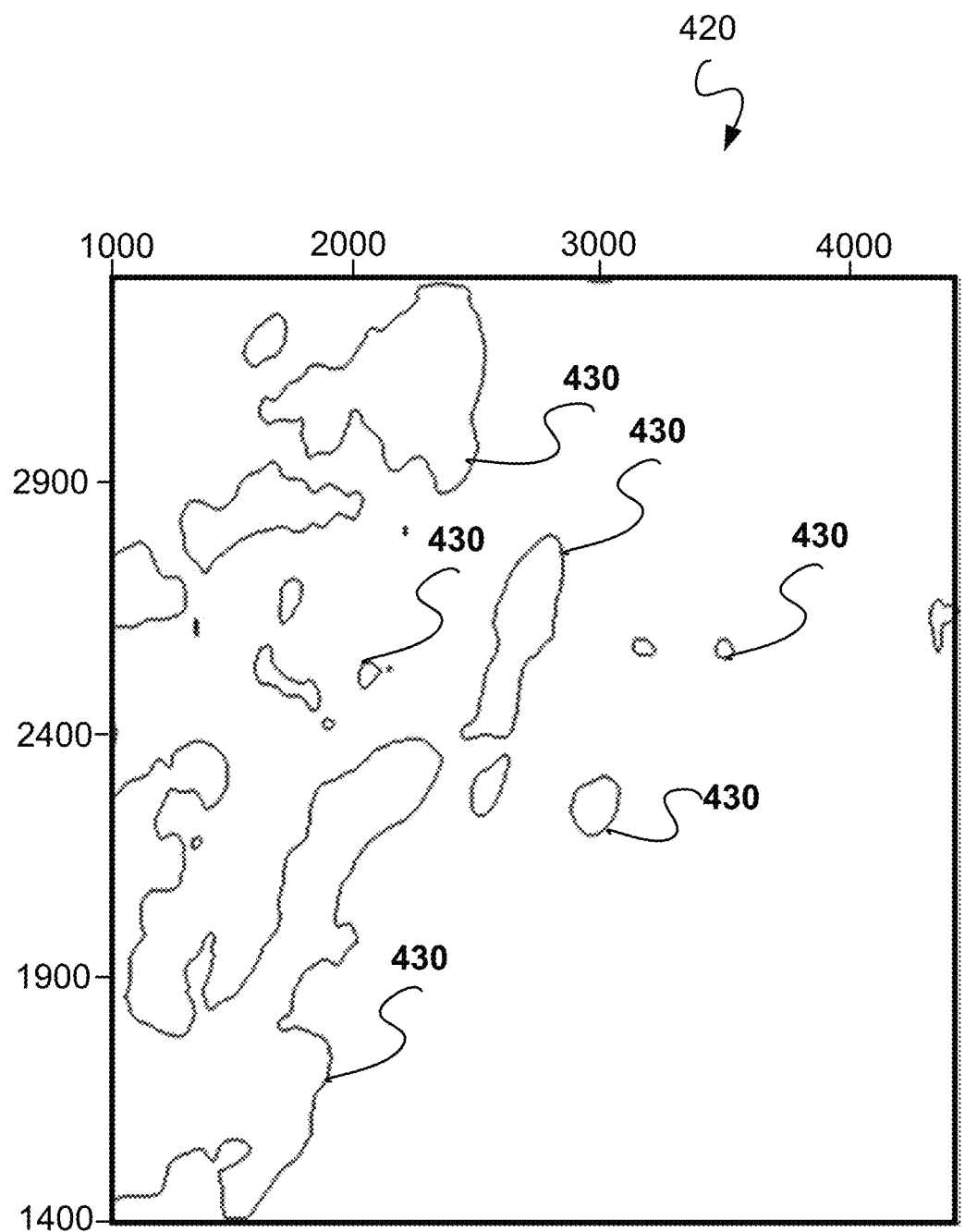

Returning to FIG. 3A, the computer processor applies edge detection to the sub-surface to generate edges of the compartments and corresponding shapes for each group (step 304). FIG. 4D shows the edges 430 and corresponding shapes for sub-surface 420. The area of each shape is calculated to measure the spatial variation and geobody distribution quantitatively (step 305).

As visible in FIGS. 4C and 4D, a shape with a larger area represents a more continuous distribution of a seismic attribute, which may indicate a larger geobody. The area metric of these compartments can be leveraged to reveal the spatial variation of the geobody quantitatively. Meanwhile, the geometry of these compartments indicates the distribution characteristics of the geobody. The computer processer computes the area of each shape and then assign the area to each cell enclosed in the shape. The computed areas are normalized by the area of the largest shape.

Figure 4E:
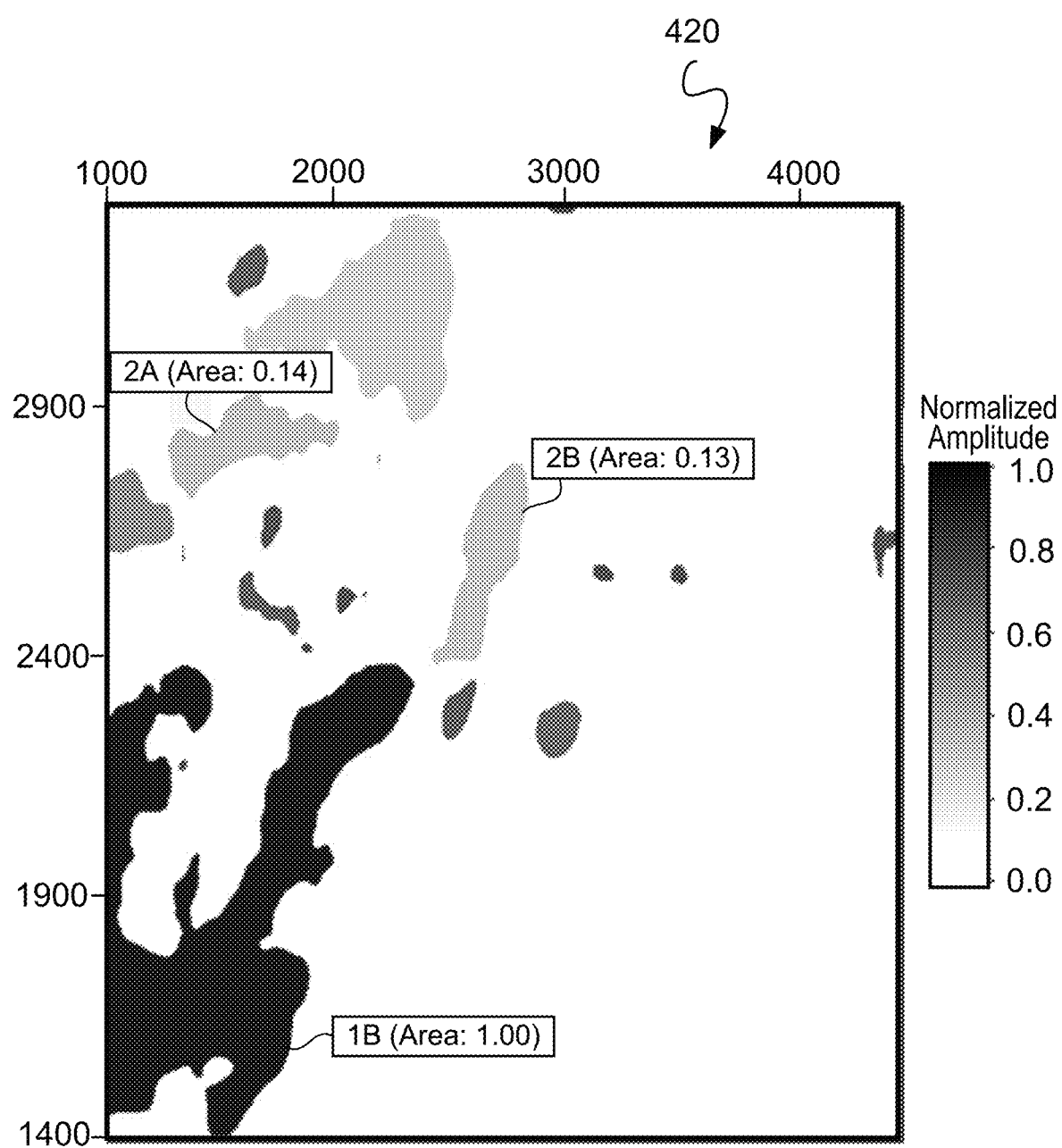

FIG. 4E shows the computed spatial variation map of the sub-surface 420 shown in FIG. 4D annotated with the normalized areas assigned to several of the larger shapes. In this example, shape 1B is more continuous than compartments 2A and 2B. Compartment 2A appears about the same size as 2B, which is consistent with quantitative variation measured by the area metric of both compartments. The normalized areas of shapes 1B, 2A and 2B are 1, 0.13 and 0.14, respectively. These results demonstrate that the spatial variation can be measured by using the area metric.

The edge detection (step 304 in FIG. 3A), area calculation (step 305 in FIG. 3A), and area assignment are repeated each sub-surface representing the individual groups of surface amplitudes. In this manner, all N sub-surfaces are processed to generate a respective variation map for each sub-surface.

Figure 4F:
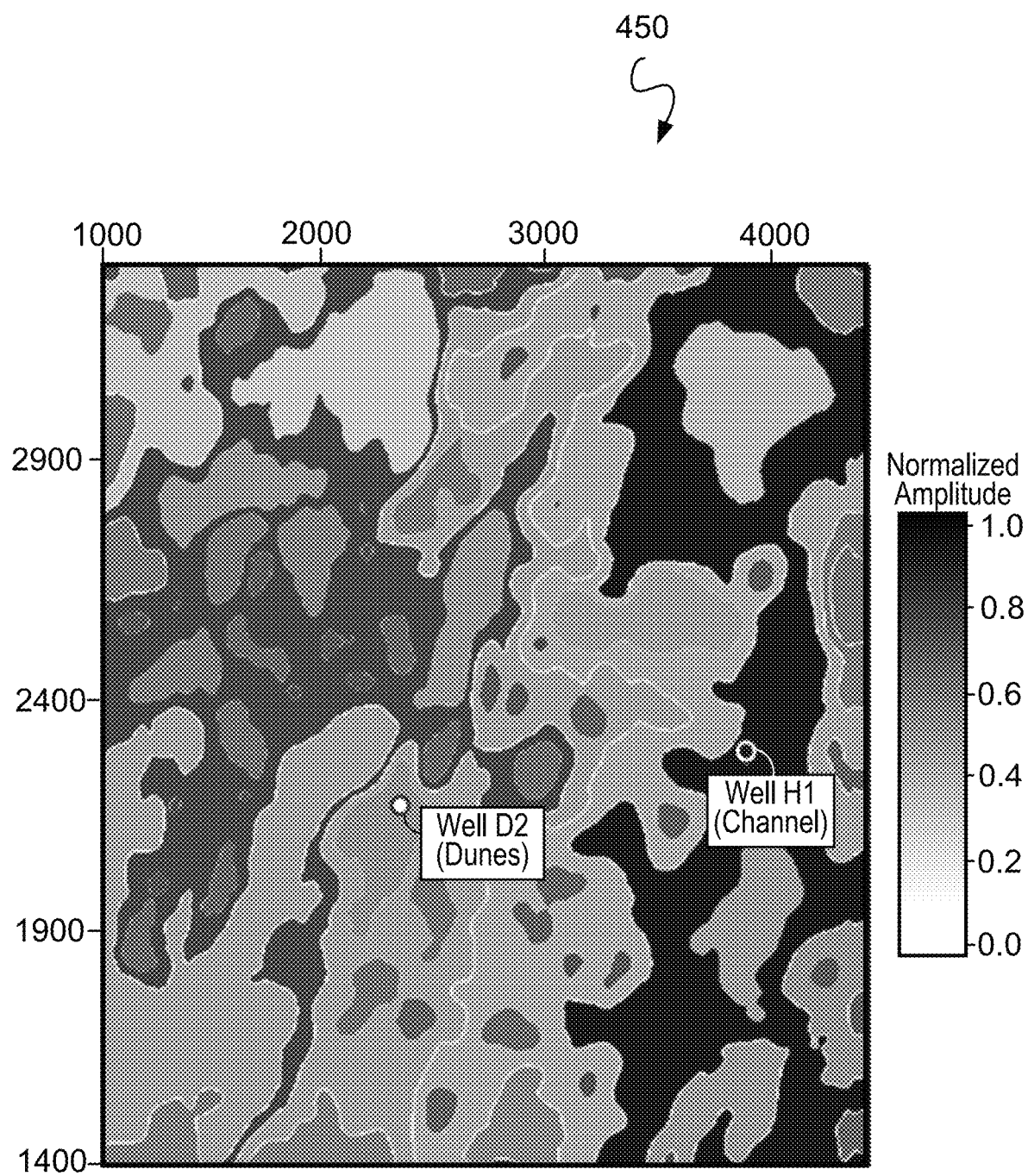

After the individual variation maps are produced, the computer processor merges the variation maps obtained from the respective N sub-surfaces (step 306 in FIG. 3A). This merging generates a final variation surface 450 (shown in FIG. 4F) in which the area of each shape with the same amplitude sub-range can be calculated to measure the variation distribution and the compartment geometry can be used to characterize the distribution of sediments with the same variation. As discussed earlier, a larger shape indicates more continuity of similar seismic attributes, which indicates a larger geobody. Meanwhile the shape's shape may characterize the geobody distribution in that dunes may exhibit more patchy patterns while sedimentary facies can appear as larger, longer shapes. FIG. 4F shows the final variation map 450 where lighter shades indicate shapes that are less continuous and darker shades indicate shapes that are more continuous.

The final variation map 450 is interpreted using geological knowledge and experience to extract geological information (step 307). Generally, in geology, different depositional systems are believed to have their own depositional models. Fox example, fluvial and aeolian systems have different depositional models which means different facies are developed in each system. Different facies also have their own signature that can be identified in cores and well logs. As described earlier, seismic data is a comprehensive reflection of the subsurface. As such, interpreting the depositional environment from seismic data is a process that gives geological meanings to the seismic reflections based on these depositional models. The system can use the final variation map 450 to generate an indication to drill a well at a position selected based at least in part on the variation map.

In this example, the color of compartments indicates the distribution extent of the sediments. For example, a light color may indicate a smaller geobody while dark color can indicate a larger geobody. The shape of color compartments can roughly characterize the geometry of sediments. During this step, geological knowledge may be integrated to interpret the depositional environment. For illustration, the area represented by the normalized surface shown in FIG. 4A is known to have aeolian and fluvial facies as dominant features. In this area, larger geobodies can be interpreted as longer fluvial sediments such as channels while smaller geobodies can be interpreted as patchy aeolian sediments such as dunes. In this particular case, it is unlikely that a large geobody is a dune because a single dune cannot extend widely. Log and core data can be used to calibrate the interpretation.

In the formation represented by the normalized surface shown in FIG. 4A, a well D2 was drilled in a location that the computer processor interpreted as being a dune facies based on the final variation map 450. A well H1 was drilled in a location that the computer processor interpreted as being a channel facies based on the final variation map 450. Well logging at both wells indicated the presence of the anticipated facies.

FIGS. 5A and 5B contrast two approaches of differentiating depositional features to highlight an improvement in differentiating depositional features. FIG. 5A illustrates approaches that characterize the "continuity" of a geologic feature 500 by the maximum lateral distance 510 from a specified location and in a specified azimuthal direction that the reflection character of a seismic event is essentially unchanged. This approach represents the two-dimensional distribution of sediments in a stratum using a one-dimensional parameter. In contrast, FIG. 5B illustrates the approach described in this specification that characterizes the "continuity" of a geologic feature 500 by the area 512 in which the reflection character of a seismic event is essentially unchanged. Measuring continuity by the area of shapes enables more fine-grained analysis of geologic features, better accounts for features such as lobes in geologic features, and enables the quantitative differentiation of dune and fluvial facies.

FIG. 6 illustrates how a system implementing the method of FIGS. 3A and 3B can be integrated with workflows to improve characterization of sedimentary facies. FIG. 6 shows a system 530 that includes reflection variation analysis 531 and integrate classification and continuity analysis 532. To the extent that seismic waveform is characterized as a comprehensive response of seismic wavelet convolved with the geology of the subsurface, such seismic waveform contains seismic amplitude, phase and frequency. Differences in seismic waveform thus reveals of differences in geologic character. Therefore, seismic waveform can be an excellent attribute to recognize the sedimentary facies. However, waveform classification measures the trace-to-trace similarity of waveforms and thus may be limited in its capability to quantify the reflection continuity. As such, waveform classification may not readily distinguish dunes facies from fluvial features. By including reflection variation analysis 531 and integrating classification and continuity 532 as described with respect to FIGS. 3A and 3B, a workflow predicated on waveform classification can identify dunes facies with improved sensitivity and specificity. Therefore, quantifying the reflection variation is important for sedimentary facies recognition. Implementations described in this disclosure allow computers to differentiate features such as dunes and fluvial facies more readily than before. Such capabilities were not conceivable by resorting to manual labor to inspect and calculate, for example, the area metrics of seismic traces from cells at various strata.

FIG. 7 is a block diagram illustrating a computer system 600 used to provide computational functionalities associated with described algorithms, methods, functions, processes, flows, and procedures, according to an implementation of the present disclosure. The illustrated computer 602 is intended to encompass any computing device such as a server, desktop computer, laptop/notebook computer, wireless data port, smart phone, personal data assistant (PDA), tablet computing device, one or more processors within these devices, another computing device, or a combination of computing devices, including physical or virtual instances of the computing device, or a combination of physical or virtual instances of the computing device. Additionally, the computer 602 can be or include a computer that includes an input device, such as a keypad, keyboard, touch screen, another input device, or a combination of input devices that can accept user information, and an output device that conveys information associated with the operation of the computer 602, including digital data, visual, audio, another type of information, or a combination of types of information, on a user interface (UI) such as a graphical-type user interface (or GUI).

The computer 602 can serve in a role in a computer system as a client, network component, a server, a database or another persistency, another role, or a combination of roles for performing the subject matter described in the present disclosure. The illustrated computer 602 is communicably coupled with a network 630. In some implementations, one or more components of the computer 602 can be configured to operate within an environment, including cloud-computing-based, local, global, another environment, or a combination of environments.

The computer 602 is an electronic computing device operable to receive, transmit, process, store, or manage data and information associated with the described subject matter. According to some implementations, the computer 602 can also include or be communicably coupled with a server, including an application server, e-mail server, web server, caching server, streaming data server, another server, or a combination of servers.

The computer 602 can receive requests over a network 630 (for example, from a client software application executing on another computer 602) and respond to the received requests by processing the received requests using a software application or a combination of software applications. In addition, requests can also be sent to the computer 602 from internal users, external or third-parties, or other entities, individuals, systems, or computers.

Each of the components of the computer 602 can communicate using a system bus 603. In some implementations, any or all of the components of the computer 602, including hardware, software, or a combination of hardware and software, can interface over the system bus 603 using an application programming interface (API) 612, a service layer 613, or a combination of the API 612 and the service layer 613. The API 612 can include specifications for routines, data structures, and object classes. The API 612 can be either computer-language independent or dependent and refer to a complete interface, a single function, or even a set of APIs. The service layer 613 provides software services to the computer 602 or other components (whether illustrated or not) that are communicably coupled to the computer 602. The functionality of the computer 602 can be accessible for service consumers using this service layer. Software services, such as those provided by the service layer 613, provide reusable, defined functionalities through a defined interface. For example, the interface can be software written in JAVA, C++, another computing language, or a combination of computing languages providing data in extensible markup language (XML) format, another format, or a combination of formats. While illustrated as an integrated component of the computer 602, alternative implementations can include the API 612 or the service layer 613 as stand-alone components in relation to other components of the computer 602 or other components (whether illustrated or not) that are communicably coupled to the computer 602. Moreover, any or all parts of the API 612 or the service layer 613 can be implemented as a child or a sub-module of another software module, enterprise application, or hardware module without departing from the scope of the present disclosure.

The computer 602 includes an interface 604. Although illustrated as a single interface 604 in FIG. 6, two or more interfaces 604 can be used according to particular needs, desires, or particular implementations of the computer 602. The interface 604 is used by the computer 602 for communicating with another computing system (whether illustrated or not) that is communicatively linked to the network 630 in a distributed environment. Generally, the interface 604 is operable to communicate with the network 630 and comprises logic encoded in software, hardware, or a combination of software and hardware. More specifically, the interface 604 can comprise software supporting one or more communication protocols associated with communications such that the network 630 or interface's hardware is operable to communicate physical signals within and outside of the illustrated computer 602.

The computer 602 includes a processor 605. Although illustrated as a single processor 605 in FIG. 6, two or more processors can be used according to particular needs, desires, or particular implementations of the computer 602. Generally, the processor 605 executes instructions and manipulates data to perform the operations of the computer 602 and any algorithms, methods, functions, processes, flows, and procedures as described in the present disclosure.

The computer 602 also includes a database 606 that can hold data for the computer 602, another component communicatively linked to the network 630 (whether illustrated or not), or a combination of the computer 602 and another component. For example, database 606 can be an in-memory, conventional, or another type of database storing data consistent with the present disclosure. In some implementations, database 606 can be a combination of two or more different database types (for example, a hybrid in-memory and conventional database) according to particular needs, desires, or particular implementations of the computer 602 and the described functionality. Although illustrated as a single database 606 in FIG. 6, two or more databases of similar or differing types can be used according to particular needs, desires, or particular implementations of the computer 602 and the described functionality. While database 606 is illustrated as an integral component of the computer 602, in alternative implementations, database 606 can be external to the computer 602. As illustrated, the database 606 holds the previously described seismic data 616.

The computer 602 also includes a memory 607 that can hold data for the computer 602, another component or components communicatively linked to the network 630 (whether illustrated or not), or a combination of the computer 602 and another component. Memory 607 can store any data consistent with the present disclosure. In some implementations, memory 607 can be a combination of two or more different types of memory (for example, a combination of semiconductor and magnetic storage) according to particular needs, desires, or particular implementations of the computer 602 and the described functionality. Although illustrated as a single memory 607 in FIG. 6, two or more memories 607 or similar or differing types can be used according to particular needs, desires, or particular implementations of the computer 602 and the described functionality. While memory 607 is illustrated as an integral component of the computer 602, in alternative implementations, memory 607 can be external to the computer 602.

The application 608 is an algorithmic software engine providing functionality according to particular needs, desires, or particular implementations of the computer 602, particularly with respect to functionality described in the present disclosure. For example, application 608 can serve as one or more components, modules, or applications. Further, although illustrated as a single application 608, the application 608 can be implemented as multiple applications 608 on the computer 602. In addition, although illustrated as integral to the computer 602, in alternative implementations, the application 608 can be external to the computer 602.

The computer 602 can also include a power supply 614. The power supply 614 can include a rechargeable or non-rechargeable battery that can be configured to be either user- or non-user-replaceable. In some implementations, the power supply 614 can include power-conversion or management circuits (including recharging, standby, or another power management functionality). In some implementations, the power-supply 614 can include a power plug to allow the computer 602 to be plugged into a wall socket or another power source to power the computer 602 or recharge a rechargeable battery.

There can be any number of computers 602 associated with, or external to, a computer system containing computer 602, each computer 602 communicating over network 630. Further, the term "client," "user," or other appropriate terminology can be used interchangeably, as appropriate, without departing from the scope of the present disclosure. Moreover, the present disclosure contemplates that many users can use one computer 602, or that one user can use multiple computers 602.

Implementations of the subject matter and the functional operations described in this specification can be implemented in digital electronic circuitry, in tangibly embodied computer software or firmware, in computer hardware, including the structures disclosed in this specification and their structural equivalents, or in combinations of one or more of them. Software implementations of the described subject matter can be implemented as one or more computer programs, that is, one or more modules of computer program instructions encoded on a tangible, non-transitory, computer-readable computer-storage medium for execution by, or to control the operation of, data processing apparatus. The computer-storage medium can be a machine-readable storage device, a machine-readable storage substrate, a random or serial access memory device, or a combination of computer-storage mediums. Configuring one or more computers means that the one or more computers have installed hardware, firmware, or software (or combinations of hardware, firmware, and software) so that when the software is executed by the one or more computers, particular computing operations are performed.

The term "real-time," "real time," "realtime," "real (fast) time (RFT)," "near(ly) real-time (NRT)," "quasi real-time," or similar terms (as understood by one of ordinary skill in the art), means that an action and a response are temporally proximate such that an individual perceives the action and the response occurring substantially simultaneously. For example, the time difference for a response to display (or for an initiation of a display) of data following the individual's action to access the data can be less than 1 millisecond (ms), less than 1 second (s), or less than 5 s. While the requested data need not be displayed (or initiated for display) instantaneously, it is displayed (or initiated for display) without any intentional delay, taking into account processing limitations of a described computing system and time required to, for example, gather, accurately measure, analyze, process, store, or transmit the data.

The terms "data processing apparatus," "computer," or "electronic computer device" (or equivalent as understood by one of ordinary skill in the art) refer to data processing hardware and encompass all kinds of apparatus, devices, and machines for processing data, including by way of example, a programmable processor, a computer, or multiple processors or computers. The apparatus can also be, or further include special purpose logic circuitry, for example, a central processing unit (CPU), an FPGA (field programmable gate array), or an ASIC (application-specific integrated circuit). In some implementations, the data processing apparatus or special purpose logic circuitry (or a combination of the data processing apparatus or special purpose logic circuitry) can be hardware- or software-based (or a combination of both hardware- and software-based). The apparatus can optionally include code that creates an execution environment for computer programs, for example, code that constitutes processor firmware, a protocol stack, a database management system, an operating system, or a combination of execution environments. The present disclosure contemplates the use of data processing apparatuses with an operating system of some type, for example LINUX, UNIX, WINDOWS, MAC OS, ANDROID, IOS, another operating system, or a combination of operating systems.

A computer program, which can also be referred to or described as a program, software, a software application, a unit, a module, a software module, a script, code, or other component can be written in any form of programming language, including compiled or interpreted languages, or declarative or procedural languages, and it can be deployed in any form, including, for example, as a stand-alone program, module, component, or subroutine, for use in a computing environment. A computer program can, but need not, correspond to a file in a file system. A program can be stored in a portion of a file that holds other programs or data, for example, one or more scripts stored in a markup language document, in a single file dedicated to the program in question, or in multiple coordinated files, for example, files that store one or more modules, sub-programs, or portions of code. A computer program can be deployed to be executed on one computer or on multiple computers that are located at one site or distributed across multiple sites and interconnected by a communication network.

While portions of the programs illustrated in the various figures can be illustrated as individual components, such as units or modules, that implement described features and functionality using various objects, methods, or other processes, the programs can instead include a number of sub-units, sub-modules, third-party services, components, libraries, and other components, as appropriate. Conversely, the features and functionality of various components can be combined into single components, as appropriate. Thresholds used to make computational determinations can be statically, dynamically, or both statically and dynamically determined.

Described methods, processes, or logic flows represent one or more examples of functionality consistent with the present disclosure and are not intended to limit the disclosure to the described or illustrated implementations, but to be accorded the widest scope consistent with described principles and features. The described methods, processes, or logic flows can be performed by one or more programmable computers executing one or more computer programs to perform functions by operating on input data and generating output data. The methods, processes, or logic flows can also be performed by, and apparatus can also be implemented as, special purpose logic circuitry, for example, a CPU, an FPGA, or an ASIC.

Computers for the execution of a computer program can be based on general or special purpose microprocessors, both, or another type of CPU. Generally, a CPU will receive instructions and data from and write to a memory. The essential elements of a computer are a CPU, for performing or executing instructions, and one or more memory devices for storing instructions and data. Generally, a computer will also include, or be operatively coupled to, receive data from or transfer data to, or both, one or more mass storage devices for storing data, for example, magnetic, magneto-optical disks, or optical disks. However, a computer need not have such devices. Moreover, a computer can be embedded in another device, for example, a mobile telephone, a personal digital assistant (PDA), a mobile audio or video player, a game console, a global positioning system (GPS) receiver, or a portable memory storage device.

Non-transitory computer-readable media for storing computer program instructions and data can include all forms of media and memory devices, magnetic devices, magneto optical disks, and optical memory device. Memory devices include semiconductor memory devices, for example, random access memory (RAM), read-only memory (ROM), phase change memory (PRAM), static random access memory (SRAM), dynamic random access memory (DRAM), erasable programmable read-only memory (EPROM), electrically erasable programmable read-only memory (EEPROM), and flash memory devices. Magnetic devices include, for example, tape, cartridges, cassettes, internal/removable disks. Optical memory devices include, for example, digital video disc (DVD), Compact Disc Read-Only Memory (CD-ROM), DVD-Recordable (DVD+/−R), DVD Random Access Memory (DVD-RAM), DVD Read Only Memory (DVD-ROM), high-density DVD (HD-DVD), and BLURAY, and other optical memory technologies. The memory can store various objects or data, including caches, classes, frameworks, applications, modules, backup data, jobs, web pages, web page templates, data structures, database tables, repositories storing dynamic information, or other appropriate information including any parameters, variables, algorithms, instructions, rules, constraints, or references. Additionally, the memory can include other appropriate data, such as logs, policies, security or access data, or reporting files. The processor and the memory can be supplemented by, or incorporated in, special purpose logic circuitry.

To provide for interaction with a user, implementations of the subject matter described in this specification can be implemented on a computer having a display device, for example, a CRT (cathode ray tube), LCD (liquid crystal display), LED (Light Emitting Diode), or plasma monitor, for displaying information to the user and a keyboard and a pointing device, for example, a mouse, trackball, or trackpad by which the user can provide input to the computer. Input can also be provided to the computer using a touchscreen, such as a tablet computer surface with pressure sensitivity, a multi-touch screen using capacitive or electric sensing, or another type of touchscreen. Other types of devices can be used to interact with the user. For example, feedback provided to the user can be any form of sensory feedback. Input from the user can be received in any form, including acoustic, speech, or tactile input. In addition, a computer can interact with the user by sending documents to and receiving documents from a client computing device that is used by the user.

The term "graphical user interface," or "GUI," can be used in the singular or the plural to describe one or more graphical user interfaces and each of the displays of a particular graphical user interface. Therefore, a GUI can represent any graphical user interface, including but not limited to, a web browser, a touch screen, or a command line interface (CLI) that processes information and efficiently presents the information results to the user. In general, a GUI can include a plurality of user interface (UI) elements, some or all associated with a web browser, such as interactive fields, pull-down lists, and buttons. These and other UI elements can be related to or represent the functions of the web browser.

Implementations of the subject matter described in this specification can be implemented in a computing system that includes a back-end component, for example, as a data server, or that includes a middleware component, for example, an application server, or that includes a front-end component, for example, a client computer having a graphical user interface or a Web browser through which a user can interact with an implementation of the subject matter described in this specification, or any combination of one or more such back-end, middleware, or front-end components. The components of the system can be interconnected by any form or medium of wireline or wireless digital data communication (or a combination of data communication), for example, a communication network. Examples of communication networks include a local area network (LAN), a radio access network (RAN), a metropolitan area network (MAN), a wide area network (WAN), Worldwide Interoperability for Microwave Access (WIMAX), a wireless local area network (WLAN) using, for example, 802.11a/b/g/n or 802.20 (or a combination of 802.11x and 802.20 or other protocols consistent with the present disclosure), all or a portion of the Internet, another communication network, or a combination of communication networks. The communication network can communicate with, for example, Internet Protocol (IP) packets, Frame Relay frames, Asynchronous Transfer Mode (ATM) cells, voice, video, data, or other information between network addresses.

The computing system can include clients and servers. A client and server are generally remote from each other and typically interact through a communication network. The relationship of client and server arises by virtue of computer programs running on the respective computers and having a client-server relationship to each other.

While this specification contains many specific implementation details, these should not be construed as limitations on the scope of what can be claimed, but rather as descriptions of features that can be specific to particular implementations. Certain features that are described in this specification in the context of separate implementations can also be implemented, in combination, in a single implementation. Conversely, various features that are described in the context of a single implementation can also be implemented in multiple implementations, separately, or in any sub-combination. Moreover, although previously described features can be described as acting in certain combinations and even initially claimed as such, one or more features from a claimed combination can, in some cases, be excised from the combination, and the claimed combination can be directed to a sub-combination or variation of a sub-combination.

Particular implementations of the subject matter have been described. Other implementations, alterations, and permutations of the described implementations are within the scope of the following claims as will be apparent to those skilled in the art. While operations are depicted in the drawings or claims in a particular order, this should not be understood as requiring that such operations be performed in the particular order shown or in sequential order, or that all illustrated operations be performed (some operations can be considered optional), to achieve desirable results. In certain circumstances, multitasking or parallel processing (or a combination of multitasking and parallel processing) can be advantageous and performed as deemed appropriate.

Moreover, the separation or integration of various system modules and components in the previously described implementations should not be understood as requiring such separation or integration in all implementations, and it should be understood that the described program components and systems can generally be integrated together in a single software product or packaged into multiple software products.

Furthermore, any claimed implementation is considered to be applicable to at least a computer-implemented method; a non-transitory, computer-readable medium storing computer-readable instructions to perform the computer-implemented method; and a computer system comprising a computer memory interoperably coupled with a hardware processor configured to perform the computer-implemented method or the instructions stored on the non-transitory, computer-readable medium.

What is claimed is:

1. A computer-implemented method for characterizing depositional features of a formation by geological-based seismic classification, the method comprising:
    activating the seismic source to launch the seismic waves into the formation;
    accessing data associated with the formation, the data encoding seismic waves as seismic traces reflected from cells at various locations within a stratum of the formation in response to a seismic source;
    classifying the cells into multiple non-overlapping groups according the seismic traces reflected from the cells at the various locations within the stratum;
    for each non-overlapping group of cells, identifying one or more subgroups of adjacent cells;
    for the one or more subgroups of adjacent cells identified from a group of cells, calculating a subgroup area metric for each subgroup of cells by combining contributions from adjacent cells in a subgroup, wherein each subgroup is represented by a polygon, and wherein the subgroup area metric characterizes an area or a shape of the polygon;
    generating a variation map of the stratum based on the subgroup area metric;
    characterizing one or more depositional features within the stratum based at least in part on the variation map using the subgroup area metric, wherein the one or more depositional features comprise dunes and fluvial facies within the stratum; and
    displaying the characterization to a user on a user-interface to assist oil exploration in the formation.

2. The method of claim 1, further comprising: generating an indication to drill a well at a position selected based at least in part on the variation map.

3. The method of claim 1, wherein each trace comprise a seismic attribute indicative of an amplitude value of seismic waves reflected from the various locations within the stratum.

4. The method of claim 3, wherein classifying the cells from the stratum into multiple non-overlapping groups comprises: computing compound amplitude values of the seismic waves reflected from the locations within the stratum by summing positive amplitude values of the seismic wave.

5. The method of claim 4, wherein summing positive amplitude values of the seismic wave comprises: retaining locational information of the compound amplitude values of the seismic wave to indicate where the compound amplitude values are located within the stratum.

6. The method of claim 4, further comprising:
determining a range of the compound amplitude values; and
dividing the range of the compound amplitude values into multiple non-overlapping and continuous sub-ranges such that the one of more subgroups of adjacent cells are identified, each subgroup of cells forming a continuous patch of cells whose corresponding compound amplitude values are within a particular subrange of the compound amplitude values.

7. The method of claim 6, further comprising: for each particular sub-range, segmenting each subgroup of cells to determine boundaries of each corresponding subgroup within the stratum.

8. The method of claim 7, further comprising: determining an area for each corresponding subgroup based on the segmented subgroup of cells.

9. The method of claim 8, further comprising: normalizing the areas determined for the segmented subgroups of cells that correspond to the particular subrange of the compound amplitude values.

10. The method of claim 7, further comprising: determining a shape for each corresponding subgroup of cells based on the segmented subgroup of cells.

11. The method of claim 7, wherein generating the variation map comprises: consolidating determinations of the subgroup area metric from all subgroups of cells and for all sub-ranges of the compound amplitude values.

12. The method of claim 7, further comprising: normalizing the subgroup area metrics determined for the segmented subgroups from all sub-ranges of the compound amplitude values.

13. A computer system comprising one or more processors, wherein the one or more processors are configured to perform operations of:
activating the seismic source to launch the seismic waves into the formation;
accessing data associated with the formation, the data encoding seismic waves as seismic traces reflected from cells at various locations within a stratum of the formation in response to a seismic source;
classifying the cells into multiple non-overlapping groups according the seismic traces reflected from the cells at the various locations within the stratum;
for each non-overlapping group of cells, identifying one or more subgroups of adjacent cells;
for the one or more subgroups of adjacent cells identified from a group of cells, calculating a subgroup area metric for each subgroup of cells by combining contributions from adjacent cells in a subgroup, wherein each subgroup is represented by a polygon, and wherein the subgroup area metric characterizes an area or a shape of the polygon;
generating a variation map of the stratum based on the subgroup area metric; characterizing one or more depositional features within the stratum based at least in part on the variation map using the subgroup area metric, wherein the one or more depositional features comprise dunes and fluvial facies within the stratum; and
displaying the characterization to a user on a user-interface to assist oil exploration in the formation.

14. The computer system of claim 13, wherein classifying the cells from the stratum into multiple non-overlapping groups comprises: computing compound amplitude values of the seismic waves reflected from the locations within the stratum by summing positive amplitude values of the seismic wave along the stratum's axial direction.

15. The computer system of claim 14, wherein summing positive amplitude values of the seismic wave comprises: retaining locational information of the compound amplitude values of the seismic wave to indicate where the compound amplitude values are transversely located within the given stratum.

16. The computer system of claim 14, the operations further comprising:
determining a range of the compound amplitude values; and
dividing the range of the compound amplitude values into multiple non-overlapping and continuous sub-ranges such that the one or more subgroups of adjacent cells are revealed, each subgroup of cells forming a continuous patch of cells whose corresponding compound amplitude values are within a particular subrange of the compound amplitude values.

17. The computer system of claim 16, the operations further comprising: for each particular sub-range, segmenting each subgroup of cells to determine boundaries of each corresponding subgroup within the stratum.

18. The computer system of claim 17, the operations further comprising:
determining an area metric for each corresponding subgroup based on the segmented subgroup of cells; and
consolidating determinations of the area metric from all subgroups of cells and for all sub-ranges of the compound amplitude values.

* * * * *

UNITED STATES PATENT AND TRADEMARK OFFICE
CERTIFICATE OF CORRECTION

PATENT NO. : 10,983,235 B2
APPLICATION NO. : 16/131316
DATED : April 20, 2021
INVENTOR(S) : Si-Hai Zhang et al.

Page 1 of 1

It is certified that error appears in the above-identified patent and that said Letters Patent is hereby corrected as shown below:

In the Claims

In Column 16, Line 38, Claim 1, please delete "according" and insert -- according to --

In Column 17, Line 19, Claim 7, please delete "sub- range" and insert -- sub-range --

In Column 17, Line 50, Claim 13, please delete "according" and insert -- according to --

In Column 18, Line 28, Claim 15, before "stratum" please delete "given"

Signed and Sealed this
Twenty-fourth Day of August, 2021

Drew Hirshfeld
*Performing the Functions and Duties of the
Under Secretary of Commerce for Intellectual Property and
Director of the United States Patent and Trademark Office*